July 25, 1950  M. M. ROGERS  2,516,485
NOTE NAME FINDER FOR USE BY STUDENTS OF MUSIC
Filed Jan. 16, 1948
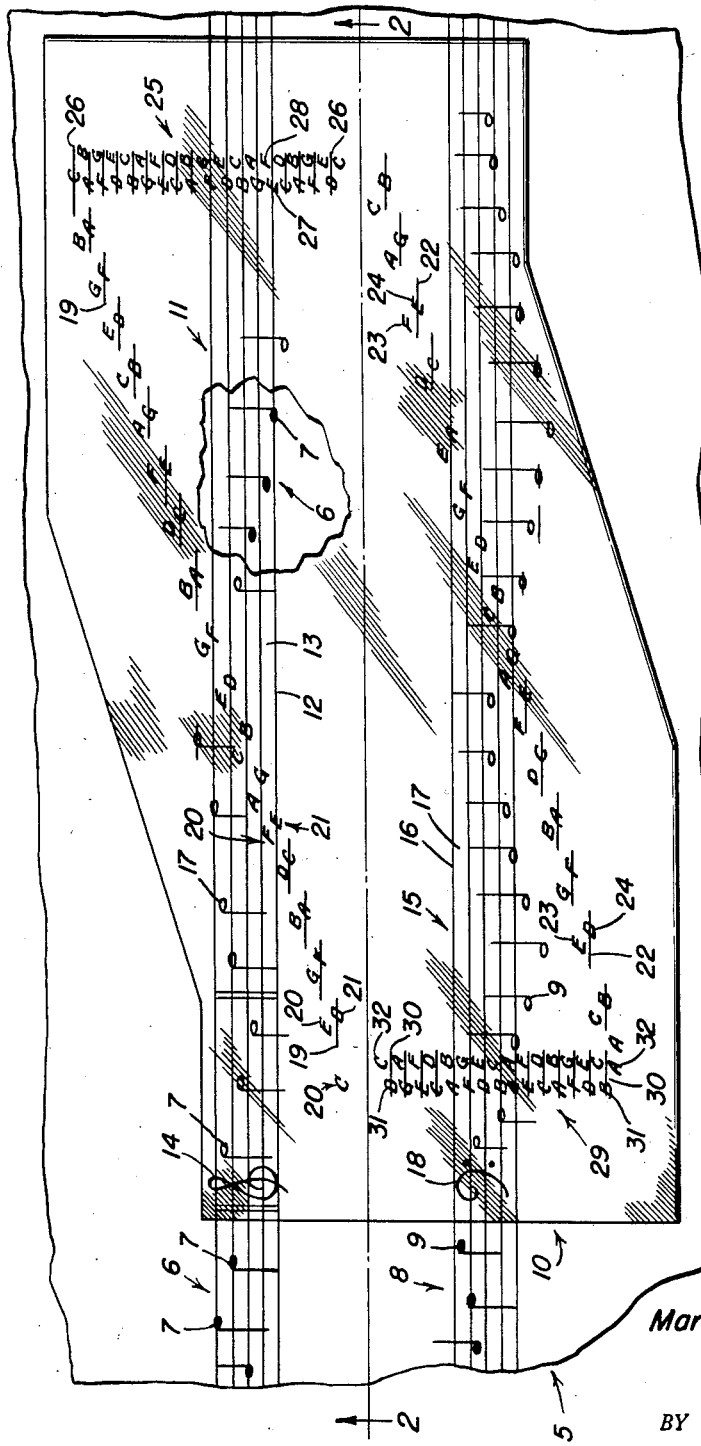
Margaret M. Rogers
INVENTOR.

Patented July 25, 1950

2,516,485

UNITED STATES PATENT OFFICE 2,516,485

NOTE NAME FINDER FOR USE BY STUDENTS OF MUSIC

Margaret M. Rogers, Crane, Ind.

Application January 16, 1948, Serial No. 2,656

4 Claims. (Cl. 84—477)

The present invention relates to a novel telltale instrument of simple ruler-type form which is expressly adapted for use by a student of music and which is characterized by novel indicia which functions in a manner to enable the user to match and compare components of said indicia with standard printed matter on a sheet of music, or the like, whereby to thus learn and memorize the commonly used letter names of given musical notes on said sheet.

More specifically, the invention has reference to an instrumentality of the aforementioned character which constitutes a handily and readily usable tell-tale for use in conjunction with sheet music, or equivalent compositions, and which is expressly adapted to guide the user in readily and systematically finding the letter names of standard musical notes, as customarily printed on said sheet, the preferred embodiment thereof being in the form of a transparent templet having selectively usable standard staves adapted to be laid over and matched with treble and bass staves existing on said sheet, the lines and spaces of said templet staves having coinciding alphabetically arranged letters which, when lined up with corresponding notes on said sheet, translate and thus give the letter names of any and all given notes.

Another object of the invention is to provide a simple and practical note name finder which lends itself admirably well to practical use by students of music due to the fact that the staves and letter media which is printed or inscribed on the templet enables the user, through proper use of the same, to recognize and identify standard musical notations, as they appear on a staff, by their letter names, for example, the note of the first line, treble clef, as E, the note of the first space, as F and so on and so forth.

Another object of the invention is to provide a simple and economical instrument having the stated facilities which function to enable the student to identify the name of a given note on sight, which makes no attempt to identify sharps or flats, but simply indicates the face value of a selected or chosen note, that is the letter name (A through G) of the note.

A further object of the invention is to provide a note name finding templet which is held flat against the sheet of music and which must of necessity be transparent to enable the chosen note to be read through said templet, the media for treble use being of one color, the media for bass clef use being of another color and the range of utility being such that the entire piano-forte may be matched and compared informatively with said media.

Other objects, features and advantages will become more readily apparent from the following description and the accompanying illustrative drawings.

In the drawings:

Figure 1 is a top plan view showing, fragmentarily, a portion of a sheet of music, and showing the improved note name finder, devised by me, applied for use atop said sheet.

Figure 2 is a longitudinal sectional view, fragmentary in character, taken on the plane of the line 2—2 of Figure 1, looking in the direction of the arrows.

Referring now to the drawings and to Figure 1 the numeral 5 designates a standard sheet of music having a treble staff 6 at the top provided with customary printed notes or musical notations 7. Below the staff 6 is a second bass staff 8 having printed notations 9. In practice these staves 6 and 8 are provided with customary treble and bass clefs and other standard indicia. The sheet 5 by itself forms no part of the invention but is necessarily shown to enable the reader to understand the invention and the mode of operation of same.

Referring now to the invention it comprises a ruler-like instrument, the main part of which may be conveniently designated as a templet 10. This part is transparent and is preferably made from indestructible plastic material. Although the templet might well be rectangular in plan view, it is here shown as slightly irregularly shaped, merely to conserve in material and to provide an area or field within which to display the aforementioned tell-tale media. The numeral 11 designates one staff and it is made up of the usual five lines 12 and intervening spaces 13. This staff will have to be such in proportion that it may be matched with and placed directly over the staff 6. Incidentally, as the signature 14 at the left discloses this is a treble staff and coincides with the treble staff 6. The inscribed or otherwise formed lines 12 which go to make up the staff, and also the signature are displayed in the color red. This is done to distinguish the staff 11 from the complemental lower bass staff 15. The latter also comprises conventional lines 16 and intervening spaces 17, there being a bass clef signature at the left as denoted at 18. The lines 16 and signature 18 are in this instance colored blue. Thus, the user may readily distinguish the treble from the bass and in so doing this will enable him to be sure that the proper staff on the instrument is matched with the correctly chosen staff on the sheet of music.

The numerals 19 designate red colored ledger lines above and below the staff 11 and the numeral 20 designates letters indicative of the name of notes occurring in the spaces whereas the numeral 21 designates letters which identify the name of notes on the lines. It is understood that there are no actual notes on this instrument but that the notes are only on the sheets of music and are visible through the instrument.

Reference being had to the staff 15, the indicia or media is fundamentally the same as that already described. That is to say, the upper and lower ledger lines, above and below the staff are denoted by the numerals 22, and the space letters are designated as 23 and the line letters as 24. The letters and lines in this instance also are colored blue to correspond with the blue staff 15. Of course, other colors may be used as long as they contrast but I have found blue and red as ample for my purposes.

At the right of Figure 1 and at right angles to the staff 11 I provide columned notations denoted, unitarily by the numeral 25 and made up of short ledger lines 26 and coacting note name letters 27 and 28 respectively. This means 25 constitutes a convenient and readily usable chord finder, that is enables one to learn the names of a plurality of notes used in chord relationship. Here again the lines and letters are red.

At the lower left a corresponding chord finder for the bass staff is employed and this is denoted by the numeral 29 and is made up of lines 30 and separately and selectively usable note letter names or letters 31 and 32. In this instance the lines and letters are colored blue.

To use the finder, the locater and masking staves 11 and 15 are brought into use. If the user desires to acquaint himself with any given note name on the treble staff 6, he places the instrument on the sheet and lines up the staff 11 with said staff 6. The lines 12 mask out the regular lines on the staff 6 and the notes 7 appear through the transparent templet 10. The device may be used so that the letters are placed alongside of and compare with the notes, whereby to permit the observer to see both the note and letter. Or, the device may be slid sideways to bring a given letter into proper association with a chosen note, whereby to supply the name of the stated note.

It will be plain that the invention is not to be confused with complicated transcribers, and devices for transposing keys and similar instrumentalities which are used for far more advanced learning and results. It is a simple finder and indicator matchable with standard musical compositions and the like whose repeated and careful use will enable the user to compare, check and thus acquaint himself with the letter names of lines and spaces on the staff as well as the notations printed on the lines or in the spaces, as the case may be.

Changes in shape, size, materials and rearrangement of details and parts may be resorted to in actual practice, so long as they do not depart from the spirit of the invention or the scope of the appended claims, as is well understood.

Having described the invention, what is claimed as new is:

1. A tell-tale hand-type finder for use in conjunction with sheet music and expressly adapted to guide the user in readily plotting and systematically finding the letter names of standard musical notes printed on said sheet comprising a transparent templet having a standard staff adapted to be laid over and shiftably matched with a staff on said sheet, the lines and spaces of said templet staff having complemental and coinciding alphabetically arranged letters which, when lined up with corresponding notes on said sheet translate and thus give the letter names of any and all given notes, a second staff on said templet independent of the first staff and provided with alphabetically arranged note name letters, one staff being adapted to accommodate the treble clef signature, the second staff being adapted to accommodate a bass clef signature, each staff and its letters being of a readily discernible color, distinct and different from the selected color other staff and letters.

2. A hand shifted finder, through the medium of which, one may readily sight read musical notations appearing on a conventional sheet of written music and may simultaneously appropriate letters indicative of the letter names of said notations comprising a relatively small ruler-like template; the latter being flat, transparent, and adapted to be laid on the surface of said sheet and moved by hand over the various staves of music on said sheet and having a visibly scored guide staff having non-transparent lines to match with and mask out the lines of the chosen staff on said sheet and so as to allow the notations on the latter to appear to be "projected" through the template and onto the lines of said guide staff, and said template having customary letter names, A to G, associated in correct order with the proper lines and spaces of said guide staff so as to permit the user to pick out a given musical notation on said sheet, shift the template into predetermined properly aligned position, and then bring to light, through said template and letters on the guide staff of the latter, the conventional letter name of said notation.

3. A hand-type ruler-like note name finder adapted to enable a student of music to readily and accurately learn the letter name of any desired note or notes by placing said finder over and in registry with regularly printed music on a standard sheet of written music comprising a flat transparent template, at least one surface of said template having a treble staff scored permanently thereon, the lines of said staff being colored red and being non-transparent and being adapted for alignment with the lines of the treble staff on said sheet and to cover and mask out the latter lines and to allow the notes to appear through, as if on, said template and in precise scale relation to the lines and spaces on said staff, note name letters alphabetically scored in red on said template staff in proper sequential order in respect to the lines and spaces of said last named staff, whereby the letters and notes coincide and supply the reader with the note names of the stated notes.

4. The structure specified in claim 3, together with a bass staff also scored permanently on said template beneath and in approximate parallelism with said treble staff, said bass staff including lines and spaces and the lines being colored blue and being non-transparent and being adapted for alignment with the lines of the bass staff on said sheet and to cover and mask out the latter lines and to allow the notes to appear through, as if on, said template and in precise scale relation to the lines and spaces of said bass staff, and note name letters alphabetically scored, in blue, on said bass staff in proper sequential order in reference to the lines and spaces of said last named staff in the manner and for the purposes stated.

MARGARET M. ROGERS.

REFERENCES CITED

The following references are of record in the file of this patent:

UNITED STATES PATENTS

| Number | Name | Date |
| --- | --- | --- |
| 138,714 | Thompson et al. | May 6, 1873 |
| 535,375 | Hill | Mar. 12, 1895 |
| 1,137,394 | Fowler | Apr. 27, 1915 |
| 1,600,676 | Kienbaum | Sept. 21, 1926 |
| 2,140,914 | Kothany | Dec. 20, 1938 |
| 2,447,903 | Dimit | Aug. 24, 1948 |